United States Patent [19]

Lafleur et al.

[11] Patent Number: 4,913,534
[45] Date of Patent: Apr. 3, 1990

[54] REAL-TIME DYNAMIC HOLOGRAPHIC IMAGE STORAGE DEVICE

[75] Inventors: Sharon S. Lafleur; Raymond C. Montgomery, both of Hampton, Va.

[73] Assignee: Administrator of the National Aeronautics and Space Administration, Washington, D.C.

[21] Appl. No.: 318,217

[22] Filed: Mar. 2, 1989

[51] Int. Cl.$^4$ .............................................. G03H 1/02
[52] U.S. Cl. .................................. 350/3.64; 350/320; 350/354
[58] Field of Search ...................... 350/3.64, 320, 354; 372/21

[56] References Cited

U.S. PATENT DOCUMENTS

| | | |
|---|---|---|
| 4,038,647 | 7/1977 | Schneider . |
| 4,284,324 | 8/1981 | Huignard et al. . |
| 4,344,042 | 8/1982 | Hon ...................................... 372/19 |
| 4,592,618 | 6/1986 | Huignard et al. . |
| 4,648,092 | 3/1987 | Ewbank et al. ........................ 372/21 |
| 4,653,857 | 3/1987 | Crossland et al. . |
| 4,674,824 | 6/1987 | Goodman et al. . |

OTHER PUBLICATIONS

Bledowski et al., "Exact Solution of Degenerate Four-Wave Mixing in Photorefractive Media", *Optics Letters*, vol., 13, No. 2, Feb. 1988, pp. 146–148.
Cronin-Golomb et al., "Theory and Applications of Four-Wave Mixing in Photorefractive Media", *IEEE Journal of Quantum Electronics*, vol. QE-20, No. 1, Jan. 1984, pp. 12–30.
Fischer, "Theory of Self-Frequency Detuning of Oscillations by Wave Mixing in Photorefractive Crystals", *Optics Letters*, vol. 11, No. 4, Apr. 1986, pp. 236–238.
Gheen et al., "Image Processing by Four-Wave Mixing in Photorefractive GaAs", *Applied Physics Letters*, vol. 51, (19), Nov. 9, 1987, pp. 1481–1483.
Gower, "Diagrammitical Analysis of Phase Conjugation Using Four-and Three-Wave Mixing Processes in Kerr-Like Non-Saturated Media", *IEEE Journal of Quantum Electronics*, vol. QE-21, no. 3, Mar. 1985, pp. 182–187.
Ja, "Real-Time Image Subtraction in Four-Wave Mixing with Photorefractive $Bi_{12}GeO_{20}$ crystals", *Optics Communications*, vol. 52, no. 6, Aug. 1982, pp. 377–380.
Kim et al., "Orthogonality Properties of Transverse Eigenmodes of Phase Conjugate Optical Resonators", Quantum Electronics Letters, *IEEE Journal of Quantum Electronics*, vol. QE-23, No. 12, Dec. 1987, pp. 2047–2050.
Laycock et al., "A Compact Real-Time Optical Processing System", *GEC Journal of Research*, vol. 2, No. 2, 1984, pp. 82–86.

(List continued on next page.)

Primary Examiner—Rodney B. Bovernick
Assistant Examiner—Jay P. Ryan
Attorney, Agent, or Firm—Harold W. Adams; John R. Manning; Charles E. B. Glenn

[57] ABSTRACT

A real-time dynamic holographic image storage device uses four-wave mixing in a pair of photorefractive crystals. An oscillation is produced between the crystals which can be maintained indefinitely after the initial object beam is discontinued. The object beam produces an interference pattern in a first crystal to produce a phase-conjugate object beam which is directed towards the second crystal. In the second crystal another interference pattern is created which produces a reconstructed object beam. The reconstructed object beam is directed back towards the first crystal. The interference patterns are produced by interaction of the object and phase-conjugate object beams with a read and write beam in each of the crystals. By manipulation of the ratio of the read and write beam intensities in at least one of the crystals, the phase-conjugate or reconstructed object beam output therefrom can be amplified to maintain stable oscillation between the two crystals.

23 Claims, 2 Drawing Sheets

REAL-TIME DYNAMIC HOLOGRAPHIC IMAGE STORAGE DEVICE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention is related to the processing and storing of holographic images and, more particularly, to a method and apparatus for dynamically storing a holographic image by oscillating between two photorefractive crystals in which interference patterns are created by four-wave mixing.

2. Description of the Related Art

Holographic images have been created, stored and manipulated in many different ways for many different purposes. Typically, a holographic image is formed using a laser, most often operating in the visible light spectrum and less often in the X-ray region or other wavelengths of electromagnetic radiation. In the following description of the prior art and the invention, the word "processing" will ordinarily be used to refer to both storage, with or without modification, and manipulation of a holographic image by, e.g., amplification, Fourier transformation, enhancement, etc. Many different types of optical elements have been used to perform such processing on laser beams carrying amplitude/phase information which will hereafter be referred to as a holographic image.

One type of optical element used to perform such processing includes a photorefractive crystal which can perform filtering and image storing functions. Such crystals may be formed of bismuth silicone oxide, barium titanate and related materials. Such crystals have been used in systems for enhancement of optical features, as taught by U.S. Pat. No. 4,674,824, to form a double phase-conjugate mirror used for image processing, interferometry and rotation sensing taught in an article by Weiss et al. in *Optics Letters,* Volume 12, No. 2, pages 114–116 and in a self-oscillator, as taught by Huignard et al. in *Proceedings of SPIE,* volume 613, pages 22–31. However, none of these systems are capable of indefinitely storing a holographic image after the original object beam discontinues to be supplied.

SUMMARY OF THE INVENTION

An object of the present invention is to provide a method of storing a holographic image without continuously supplying the original object beam.

Another object of the present invention is to provide a method for dynamically storing the holographic image using oscillation between two photorefractive crystals.

The above objects are attained by a method of storing a holographic image, comprising the steps of: receiving an object beam and first and second sets of reference beams; creating a first dynamic interference pattern between the object beam and the first set of reference beams to produce a phase-conjugate object beam; creating a second dynamic interference pattern between the phase-conjugate object beam and the second set of reference beams to produce a reconstructed object beam; and directing the reconstructed object beam into the first dynamic interference pattern to enable continuance of the first and second dynamic interference patterns after the object beam is no longer received. The dynamic interference patterns are formed due to four-wave mixing of two of the three incident beams, while the third is used to "read" the holographic image. Preferably, the first and second interference patterns are formed in first and second photorefractive crystal regions. These regions may be in separate crystals or different regions of the same crystal.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DETAILED DESCRIPTION OF THE PREFERRED EMBODIMENTS

Figure 1:
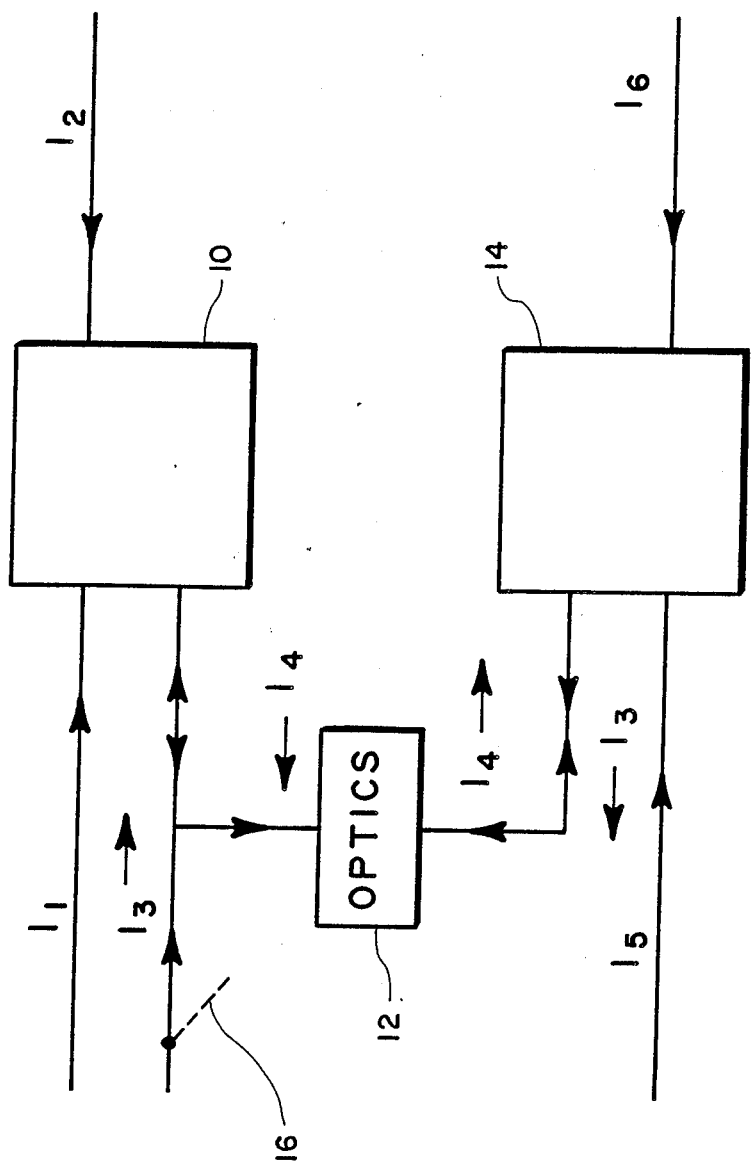
FIG. 1 is a schematic diagram of information flow in an apparatus according to the present invention.

According to the present invention, amplitude and phase information forming a holographic image supplied in an object beam $I_3$ is directed towards a first photorefractive crystal 10. A first interference pattern forms a hologram in the crystal 10 when the object beam $I_3$ meets a first set of reference beams $I_1$ and $I_2$. Reference beam $I_1$ will be referred to as a write beam and reference beam $I_2$ will be referred to as a read beam although it is also known as a pump beam. The write and read beams $I_1$ and $I_2$ are counter-propagating, i.e., directed in opposite directions as illustrated in FIG. 1.

The angular relationships between the first set of reference beams $I_1$, $I_2$ and the object beam $I_3$ is such that a phase-conjugate object beam $I_4$ is produced by crystal 10, colinear with the object beam $I_3$ and propagating in an opposite direction. The read and write beams $I_1$, $I_2$ must be colinear to produce beam $I_4$ as a phase-conjugate beam. The Optics 12 are provided for directing the phase-conjugate object beam $I_4$ towards a second photorefractive crystal 14. The optics 12 may also perform other functions as discussed below.

The phase-conjugate object beam $I_4$, together with a second set of reference beams $I_5$ and $I_6$ form a second dynamic interference pattern in crystal 14. The second set of reference beams $I_5$ and $I_6$ consist of a write beam $I_5$ and a read beam $I_6$. In a manner similar to that in crystal 10, the beams $I_4$, $I_5$ and $I_6$ produce a phase conjugate of the phase-conjugate object beam $I_4$. This resulting beam $I_3'$ is a reconstructed object beam which is counter-propagating with respect to the phase-conjugate object beam $I_4$. The optics 12 provide means for directing the reconstructed and phase-conjugate object beams $I_3'$ and $I_4$ toward crystals 10 and 14, respectively. As a result, an oscillation is set up between crystals 10 and 14 which permit a switch 16 to be opened, discontinuing the supply of the object beam $I_3$, while the first and second dynamic interference patterns are maintained.

The first and second interference patterns can be maintained due to certain properties of photorefractive crystals and the relative intensities and angular relationships between the light beams incident on the crystals 10 and 14. The hologram which constitutes the first dynamic interference pattern is formed by four-wave mixing of two coherent light beams $I_1$, $I_3$ and read beam $I_2$ which may or may not be coherent with respect to light beams $I_1$ and $I_3$. The mixing of these two beams in the first photorefractive crystal region 10 creates a phase grating within the crystal 10 which diffracts a portion of the write and read beams $I_1$ and $I_2$. This diffracted beam exits the crystal as the phase-conjugate object beam $I_4$. A similar phase grating is created in the second photorefractive crystal region 14 by the phase-conjugate object beam $I_4$, write beam $I_5$ and read beam $I_6$.

The mechanism by which the phase grating is produced in the photorefractive crystal regions is as follows. The write (reference) and object (phase-conjugate object or reconstructed object) beams will interfere because they are coherent. The resulting interference pattern produced by the addition of these two beams, that is, the spatial variations in light intensity which characterize the interference pattern, cause charge carriers within the crystal regions 10 and 14 to migrate. Charges which are created in regions of high light intensity move to regions of low light intensity. This charge migration effect may be accelerated by application of an external electric field across the crystal. After a period of time which depends upon the intensity of the incident light, magnitude and direction of the applied external field and properties of the photorefractive crystal, an equilibrium state is reached within the crystal. At equilibrium, a space charge distribution exists within the crystal which gives rise to a spatially varying electrostatic field. This electrostatic field induces a change in the index of refraction by the electro-optic effect. The spatially varying index of refraction is the phase grating which produces diffraction of the three beams.

Typically, the reference beams $I_1$, $I_2$ each have an intensity which is much greater than the intensity of the object beam $I_3$. There will usually be a difference in the intensity of the reference beams, such that the ratio $I_2 \setminus I_1$ is greater than one. The reflectivity R of the crystal is defined as indicated in equation (1).

$$R = \frac{I_4}{I_3} = \frac{\mu I_2}{I_1} \quad (1)$$

The diffraction efficiency $\mu$ is always less than one and at best is typically around 0.5. The diffraction efficiency $\mu$ can be varied by changing the orientation of the beams $I_1$, $I_2$, $I_3$ with respect to the optical axis of the crystal 10.

Thus, it is possible to amplify the object (phase-conjugate object or reconstructed object) beams by varying the angle between the optical axis of the crystal and the incident read and object beams or by varying the ratio of the intensity of the read and write beams, as well as by applying an electric field along the optical axis of the crystal 10 or 14. By changing the angles of the three beams $I_1$, $I_2$ and $I_3$ (or $I_4$, $I_5$ and $I_6$) respective to the optical axis of the crystal, energy from the read beam $I_2$ may be diffracted into the phase-conjugate object beam $I_4$ (or $I_6$ into $I_3'$). Because it is possible to amplify the object beam each time it is mixed with the read and write beams, attenuation of the signal as it passes through optics 12 does not prevent indefinite continuance of the interference patterns in the crystals 10, 14, provided the reference beams $I_1$, $I_2$, $I_5$ and $I_6$ are continuously supplied.

In addition to producing sufficient gain in one of the two crystals 10 and 14 so that the image does not degrade, oscillation of the holographic image requires that the phase of the phase-conjugate object beam $I_4$ and the reconstructed object beam $I_3'$ must be in a specific relationship. The overall round-trip phase from crystal 10 to crystal 14 and back to crystal 10 must be an integral multiple of $2\pi$. The existence of this condition is determined by the coupling coefficient, the length of the crystals and the time constant of the system. Basically, the time constant for substantially identical crystals will be roughly equal if the total light intensity incident on the crystals 10, 14 is the same, because the time constant is inversely proportional to the total light intensity.

Any material which exhibits photoconductivity or a photovoltaic operation can be used for the photorefractive crystals 10 and 14. Examples of such crystals include $Bi_{12}SiO_{20}$, $Bi_{12}GeO_{20}$, $BaTiO_3$, etc., which are sensitive to light in the visible region of the electromagnetic spectrum, and semiconductor materials such as gallium arsenide and silicon which are sensitive to light in the infrared region of the electromagnetic spectrum. Other materials may be used which are sensitive to other regions of the electromagnetic spectrum, such as X-rays. Thus, a wide range of materials and wavelengths of beams may be used in constructing this invention.

As noted above, the two crystal regions 10 and 14 may be different regions of the same crystal. On the other hand, they may be two separate crystals and may even be made of different materials. Specific dimensions of the crystals and angular arrangements of the light beams are unimportant as long as coherence is maintained between beams $I_1$, $I_3$ and $I_3'$ and between $I_4$ and $I_5$. The frequency of the beams must be matched to the characteristics of the crystals, but as noted above, any of a wide range of frequencies may be selected, depending upon the properties of the crystal chosen. Thus, the read and write beams in a single crystal do not have to be in coherence and possibly may be permitted to have slightly different frequencies, but the read beam in one crystal will have to be in coherence with the write beam in the other crystal.

The optics 12 through which the phase-conjugate object beam $I_4$ and reconstructed object beam $I_3'$ pass may be formed of many different types of optical elements, such as lenses, spatial filters (masks), etc. As noted above, the controllable amplification in one or both of the crystal regions 10 and 14 can compensate for a significant amount of loss in the optics 12 without affecting the ability of the interference patterns to be maintained in the crystals 10 and 14. The amplification which occurs in the crystals may be accomplished in many different ways, including controlling the intensity of at least one beam in the first and second sets of reference beams, or the angular relationships between the objects and reference beams in at least one of the crystals.

Figure 2:
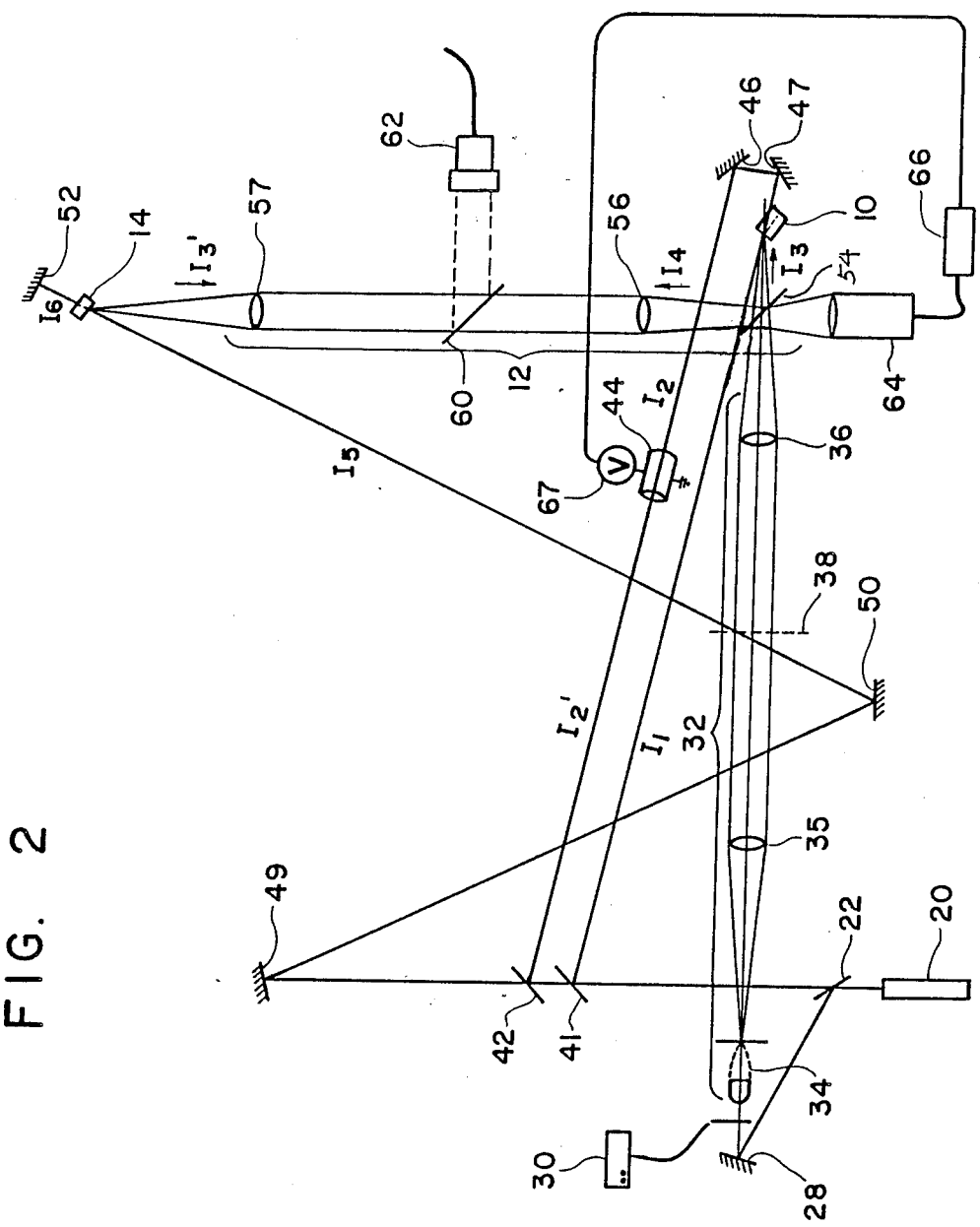
FIG. 2 is a block diagram of an embodiment of the present invention.

An embodiment of the invention indicating one way of controlling the amplification in one of the crystals is illustrated in FIG. 2. All of the light beams used in the apparatus illustrated in FIG. 2 are supplied by a laser 20. In the embodiment illustrated in FIG. 2, two separate refractive crystals 10 and 14 are used. As noted above, BaTiO$_3$ crystals may be used with light beams in the visible spectrum. Thus, the laser 20 may be an argon or helium-neon laser. While the power of the laser 20 depends upon the amount of loss in the system and the physical size of the system, a He-Ne laser with a power of 35 mW has been used to successfully create an oscillation between two BaTiO$_3$ crystals.

The light emitted by the laser 20 is separated into two beams by a beam splitter 22, such as optical glass coated with a metallic reflector with a transmission efficiency of 50%. One of the beams created by the beam splitter 22 is reflected by a mirror 28, passes through an electronic shutter 30 and object beam generation means 32. The object beam generation means 32 may include many different types of optical elements. In the illustrated embodiment, the elements include a pinhole 34, lenses 35, 36 and mask 38. The mask 38 may be a slide containing an image, including an integrated circuit mask as in the apparatus disclosed in U.S. Pat. No. 4,674,824. Alternatively, the source of the object beam may be derived from sources other than a mask. Furthermore, the object beam creation means 32 may contain any elements conventionally used to produce a holographic image.

The other beam generated by the beam splitter 22 is used to produce the reference beams. This beam passes through beam splitters 41, 42 to create three beams. The beam splitters 41 and 42 may be similar to beam splitter 22. One of the beams generated by beam splitter 41 is used to produce the write beam $I_1$ and thus is directed towards the first crystal 10. Preferably, this beam $I_1$ is of much lower intensity than the beam which is directed towards beam splitter 42. As a result, beam splitter 42 is able to generate two beams $I_2'$, $I_5$, one $I_2'$ of which is directed towards a variable attenuator 44. This beam $I_2'$ preferably has a significantly higher intensity than the write beam $I_1$. After passing through the variable attenuator 44 and reflecting off of mirrors 46, 47 this beam becomes the read beam $I_2$. The other beam $I_5$ generated by the beam splitter 42 is reflected by mirrors 49, 50 and directed towards the second crystal 14 as the write beam $I_5$. After passing through the crystal 14, this beam is reflected by mirror 52 and thus becomes the read beam $I_6$.

Thus, only a single variable attenuator 44 is required to provide beam intensity control means for controlling the intensity of at least one of the read and write beams. Alternatively, additional means for controlling intensity of other reference beams may be provided. For example, liquid crystal gates may be used to modify beam intensity and spatial distribution of the light beams. In addition to using multiple liquid crystal gates, additional variable attenuators may be used on any of the read and write beams $I_1$, $I_2$, $I_5$ and $I_6$. Any of these variable attenuators, including variable attenuator 44, may be a pockel cell, a set of linear filters, or any element capable of providing variable attenuation of light intensity, including modulation of beam amplitude. In addition, instead of using a reflection of the write beam $I_5$ to produce the read beam $I_6$, the read beam $I_6$ may be generated by, e.g., replacing mirror 49 with a beam splitter which directs one of the beams towards mirror 52. Also, it should be understood that the mirrors 49, 50 are arranged in three-dimensional space in such a manner that there is no interference with the object beam generation means 32. As illustrated in FIG. 2, the object beam $I_3$ is created after passing through a beam splitter 54. This beam splitter is part of the optics 12 illustrated in FIG. 1, although for simplicity the object beam $I_3$ is not illustrated as passing through the optics 12. The phase-conjugate object beam $I_4$, after some loss in intensity, is directed by the beam splitter 54 through lenses 56, 57 and beam splitter 60 towards the second crystal 14. The lenses 56, 57 and beam splitter 60 are also included in the optics 12 illustrated in FIG. 1. The phase-conjugate object beam $I_4$ and write and read beams $I_5$ and $I_6$ form the reconstructed object beam $I_3'$ in the second crystal 14 as described above. The beam splitter 60 provides output means for outputting at least one of the phase-conjugate and reconstructed object beams $I_3'$ and $I_4$. A camera detector or other image detecting device 62 receives the output beam. Alternatively, the output beam can be supplied as a new object beam to a holographic storage apparatus similar to that illustrated in FIG. 2. Coupling several such apparatuses with variations in spatial filters, optical switches and lenses enables the creation of an extensive optical processor or computing system. Thus, the phase-conjugate object beam or reconstructed object beam can be used in extensive processing.

As illustrated in FIG. 2, the beam splitter 54 directs a portion of the reconstructed object beam $I_4$ towards a photomultiplier tube detector 64 which comprises a sensor for control means 66, 67 for controlling the variable attenuator 44. The control means 66, 67 may comprise a delay unit 66 and voltage supply 67. Where it is desired to maintain stable oscillation between the photorefractive crystals 10 and 14 after the electronic shutter 30 closes, effectively opening switch 16 (FIG. 1), the control means 66, 67 can control the attenuation of the light beam passing therethrough in response to the light intensity detected by photomultiplier tube 64.

If it is desired to process the holographic image by, e.g., amplification, the control means can be adjusted to perform this operation. Additional operator control (not shown) or other input means can be provided to determine how the control means 66, 67 varies the attenuation of variable attenuator 44. In a simple system, the control means 66, 67 may be replaced by manual manipulation of, e.g., a set of linear filters forming the variable attenuator 44, to control the gain in crystal 10. In this case, the intensity of the light beams $I_1-I_6$ and the responsiveness of the crystals 10, 14 to the frequency of the light beam must be selected to provide sufficiently slow response, on the order of a fraction of a hertz to enable manual manipulation of a filter to control the oscillation between the crystals 10, 14. On the other hand, known photorefractive crystals have a sufficiently high responsiveness to conventional lasers to produce oscillations on the order of kilohertz. Thus, the present invention is capable of high speed processing of optical images enabling the construction of a high speed optical processor.

The foregoing is considered as illustrative only of the principles of the invention. Further, since numerous modifications and changes will readily occur to occur to those skilled in the art, it is not desired to limit the invention to the exact construction and operation shown and described, and accordingly, all suitable modifications and equivalents may be resorted to, falling within the scope and spirit of the invention as recited in the appended claims.

What is claimed is:

1. A method of storing a holographic image, comprising the steps of:

(a) receiving an object beam and first and second sets of counter-propagating, co-linear reference beams, each of said sets of counter-propagating, co-linear reference beams comprising a write beam and a read beam, said object beam and said write beams in said respective sets of reference beams being coherent;

(b) creating a first dynamic interference pattern between the object beam and the first set of counter-propagating, co-linear reference beams to produce a phase-conjugate object beam;

(c) creating a dynamic interference pattern between the phase-conjugate object beam and the second set of counter-propagating, co-linear reference beams to produce a reconstructed object beam; and (d) directing the reconstructed object beam into the first dynamic interference pattern to enable continuance of the first and second dynamic interference patterns after said receiving of the object beam is discontinued.

2. A method as claimed in claim 1, wherein said creating in steps (b) and (c) utilizes four-wave mixing of at least two of the reference beams and the object beam initially, the phase-conjugate object beam, and the reconstructed object beam subsequently.

3. A method as recited in claim 1, wherein at least one of the reference beams in the first and second sets of reference beams is independently controllable, and wherein said method further comprises the step of (e) controlling the at least one of the reference beams to adjust the holographic image stored by said method.

4. A method as recited in claim 3, wherein step (e) comprises controlling the at least one of the reference beams to maintain stable oscillation between the first and second photorefractive crystal regions.

5. A method as recited in claim 3, wherein step (e) comprises controlling the at least one of the reference beams to manipulate the holographic image.

6. A method as recited in claim 3, wherein said controlling in step (e) comprises adjusting an angular relationship between at least one of the reconstructed and phase-conjugate object beams and the first and second sets of reference beams, respectively.

7. A method as recited in claim 1, further comprising the step of processing at least one of the phase-conjugate object beam and the reconstructed object beam.

8. A method as recited in claim 1 wherein steps (b) and (c) are performed in separate crystals.

9. A method as recited in claim 1 wherein steps (b) and (c) are performed in separate crystal regions in a single crystal.

10. A method as recited in claim 9, wherein at least one of the reference beams in the first and second sets of reference beams is independently controllable, and wherein said method further comprises the step of (e) controlling the at least one of the reference beams to adjust the holographic image stored by said method.

11. A method as recited in claim 10, wherein step (e) comprises controlling the at least one of the reference beams to maintain stable oscillation between the first and second photorefractive crystal regions.

12. An apparatus for storing a holographic image, comprising:

supply means for supplying an object beam and first and second sets of counter-propagating, co-linear reference beams, each of said sets of counter-propagating, co-linear reference beams comprising a write beam and a read beam, said object beam and said write beams in said respective sets of reference beams being coherent;

first pattern means for creating a first dynamic interference pattern between the object beam and the first set of counter-propagating, co-linear reference beams to produce a phase-conjugate object beam;

second pattern means for creating a second dynamic interference pattern between the phase-conjugate object beam and the second set of counter-propagating, co-linear reference beams to produce a reconstructed object beam; and directing means for directing the reconstructed object beam into the first dynamic interference pattern to enable continuance of the first and second dynamic interference patterns after said supply means discontinues supplying the object beam and continues supplying the first and second sets of counter-propagating, co-linear reference beams.

13. An apparatus as recited in claim 12, wherein said supply means includes means for supplying said read beam and said write beam in each of said first and second sets of counter-propagating, co-linear reference beams.

14. An apparatus as recited in claim 13, further comprising controlling means for controlling at least one of said read and write beams in at least one of the said first and second sets of counter-propagating, co-linear reference beams to adjust the holographic image stored by said apparatus.

15. An apparatus as recited in claim 14, wherein said controlling means comprises beam intensity control means for controlling the intensity of the at least one of said read and write beams in the at least one of said first and second sets of counter-propagating, co-linear reference beams.

16. An apparatus as recited in claim 15, wherein said beam intensity control means comprises at least one variable attenuator.

17. An apparatus as recited in claim 15, wherein said beam intensity control means comprises at least one liquid crystal gate for modifying beam intensity and spatial distribution.

18. An apparatus as recited in claim 12, wherein said first and second pattern means respectively comprise first and second photorefractive crystal regions for receiving the object initially, the reconstructed object beam subsequently and the first set of counter-propagating, co-linear reference beams, and the phase-conjugate object beam and the second set of counter-propagating, co-linear reference beams, and for producing the phase-conjugate object beam and the reconstructed object beam, respectively.

19. An apparatus as recited in claim 18 wherein said first and second photorefractive crystal regions are formed in separate crystals.

20. An apparatus as recited in claim 18 wherein said first and second photorefractive crystal regions are formed in a single crystal.

21. An apparatus as recited in claim 12, further comprising output means for outputting at least one of the phase-conjugate object beam and the reconstructed object beam.

22. An apparatus as recited in claim 21, wherein said output means includes an image detection device for detecting an image transmitted by the at least one of the phase-conjugate object beam and the reconstructed object beam.

23. An apparatus as recited in claim 21, wherein said output means includes means for supplying the at least one of the phase-conjugate object beam and the reconstructed object beam as a new object beam to a holographic storage apparatus similar to said apparatus.

* * * * *